UNITED STATES PATENT OFFICE.

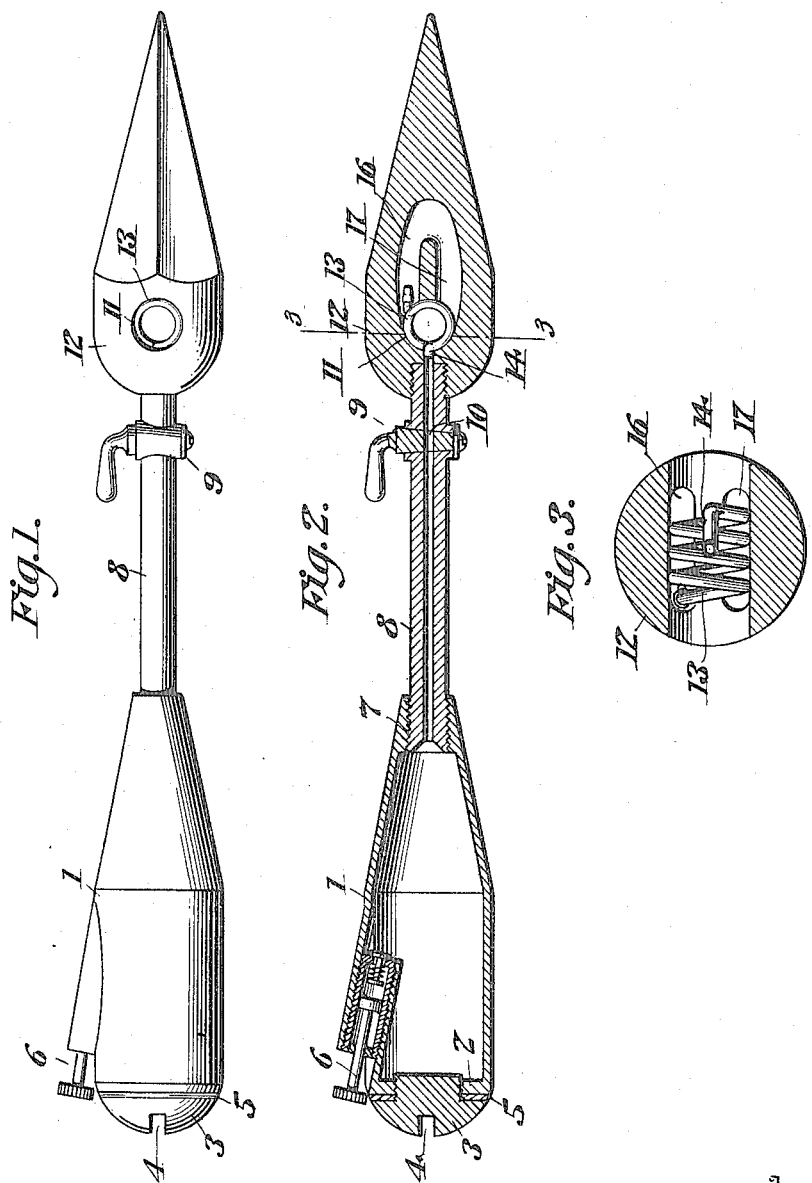

OLLIE A. WALKER, OF CLEVELAND, OHIO.

SOLDERING-IRON.

1,196,620.  Specification of Letters Patent.  Patented Aug. 29, 1916.

Application filed April 15, 1916. Serial No. 91,339.

*To all whom it may concern:*

Be it known that I, OLLIE A. WALKER, a citizen of the United States, residing at Cleveland, in the county of Cuyahoga and State of Ohio, have invented new and useful Improvements in Soldering-Irons, of which the following is a specification.

This invention appertains to soldering devices, one object of which is to provide, in the one device, suitable heating instrumentalities and the heated iron or soldering tool.

Another object of this invention is to provide a soldering iron comprising novel component elements for conducting a suitable fluid fuel to the soldering tool which embodies efficient generating facilities and combustion means.

A further object of the present invention is to provide a soldering iron of generally improved construction, whereby the device will be simple, durable and inexpensive in construction, as well as convenient, practical, serviceable and efficient in its use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in the preferred embodiment in the accompanying drawings wherein:—

Figure 1 is an elevational view of the improved soldering iron, Fig. 2 is a longitudinal section taken therethrough, Fig. 3 is a transverse sectional view taken on the line 3—3 of Fig. 2.

In carrying out the present invention there is provided a fuel reservoir or container 1 having an aperture formed at one end which is surrounded by an annular threaded flange 2. Threadedly secured to the annular threaded flange 2 is a cap or closure 3 having a kerf 4 formed in the outer face thereof, thus enabling the cap to be threadedly attached to the container 1, while a gasket 5 is interposed between the inner face of the cap or closure 2 and the outer end of the container 1. Any suitable pressure generating device may be employed and, in the present instance, there is threadedly secured to the casing 1 and communicating with the interior thereof, an air pump 6.

That end of the container 1 which is remote from the cap or closure 2 is provided with a threaded aperture 7 for the reception of one terminal of the fuel conducting tube 8. Positioned intermediate the ends of the fuel conducting tube 8 is a valve 9 having a port 10 formed therein and adapted to be disposed in axial alinement with the port of the tube 8. The terminal of the tube 8 which is remote from the container is threadedly secured within an axial aperture formed in a suitable soldering iron or tool 12.

A generating coil, which may have a predetermined number of convolutions, is positioned within a chamber or vent 11 formed within the soldering iron and has one terminal offset, as indicated at 14, to aline with the fuel conducting tube 8. Formed within the soldering iron and in communication with the chamber 11 is a U-shaped port or combustion chamber 16, one terminal of said port registering or alining with that terminal of the generating coil which is remote from the offset portion 14. The chamber 11 extends transversely through the soldering iron and communicates with the atmosphere, therefore, providing air conducting means which is in communication with the U-shaped port 16.

In practical operation, the container 1 may be readily filled with a suitable fluid fuel, preferably gasolene, by simply removing the cap or closure 3. After the fuel has been placed within the container, sufficient pressure may be generated through the instrumentality of the pressure pump 6, the operation of which is obvious, therefore, requiring no further elaboration. The valve 9 is now rotated to open position, thus allowing the fuel to be forced through the tube 8 and valve port 10, then through the offset or lead 14 and finally through the several convolutions of the generating coil 13. An ignited match or other suitable heating element is inserted into the vent 11 thus generating gas within the coil 13. This gas, in turn, is projected into the port of the combustion chamber 16 where it is thoroughly mixed with the air that is admitted through the vent 11 and, consequently, a perfect combustion of the fuel is produced with the combustion chamber 16. After the combustion has been produced, a portion of the heat thus generated will be conveyed to the generating coil through the return flue 17 of the combustion chamber and cause a continued generation of gas as long as fuel is fed to the generating coil 13.

It is manifest that the soldering tool 12 may be uniformly heated to the requisite degree by properly adjusting the valve 9, the degree of heat being commensurate with the quantity of fuel permitted to pass through the valve port 10, and since the greater portion of the conoidal or operative terminal of the soldering tool 12 is solid, this, of course, materially aids in producing a uniform temperature.

Having thus described my invention, what is claimed as new is:—

1. A device of the class described including a fuel container, a pressure pump communicating with the said container, a generating coil communicating with the fuel container, a valve adapted to control the supply of fuel to the generating coil, a soldering tool having a vent and a combustion chamber communicating with the said vent and the generating coil.

2. A device of the class described including a fuel container, a pressure pump communicating with the said container, a fuel conducting tube extending from and communicating with the fuel container, a soldering tool carried by the said tube and having a vent and a combustion chamber in communication, a generating coil having one terminal communicating with the fuel conducting tube and the opposed terminal thereof in communication with the generating chamber, and a valve carried by the fuel conducting tube and adapted to control the supply of fuel to the generating coil.

3. A device of the class described including a fuel container, a closure threadedly secured to the said container, a pressure pump communicating with the fuel container, a fuel conducting tube having one end secured to the said container and communicating therewith, a soldering tool secured to the opposed end of the fuel conducting tube, said tool having a vent extending transversely therethrough, a combustion chamber communicating with the said vent and a return flue communicating with the combustion chamber and the vent, a generating coil secured within the said vent and having one terminal communicating with the fuel conducting tube and the opposed terminal thereof in communication with the combustion chamber, and a valve carried by the fuel conducting tube and adapted to control the supply of fuel to the generating coil.

In testimony whereof I affix my signature in presence of two witnesses.

OLLIE A. WALKER.

Witnesses:
  C. T. KIRKBRIDE,
  M. E. KIRKBRIDE.

Copies of this patent may be obtained for five cents each, by addressing the "Commissioner of Patents, Washington, D. C."